Sept. 14, 1965    H. C. MINARD    3,205,773
METHOD OF PARFOCALIZING A SET OF INTERCHANGEABLE
DIFFERENT POWER MICROSCOPE OBJECTIVES
Filed Aug. 25, 1961    2 Sheets-Sheet 2

INVENTOR.
HUBERT C. MINARD
BY Frank C. Parker
ATTORNEY

United States Patent Office 3,205,773
Patented Sept. 14, 1965

3,205,773
METHOD OF PARFOCALIZING A SET OF INTERCHANGEABLE DIFFERENT POWER MICROSCOPE OBJECTIVES
Hubert C. Minard, Rochester, N.Y., assignor to Bausch & Lomb Incorporated, Rochester, N.Y., a corporation of New York
Filed Aug. 25, 1961, Ser. No. 133,856
2 Claims. (Cl. 88—39)

This invention relates to an improved method for par focalizing in a microscope a plurality of microscope objectives or other optical components thereof having a diverse focal length.

Microscopes of the more useful kinds employ a plurality of optical components, such as objectives, eyepieces and photographic attachments which require careful parfocalization when used interchangeably. Particularly, difficulties have been encountered in past efforts to effect parfocalization of a plurality of objectives since the method used did not produce uniform and reliable results.

Usually individual mircroscope objectives are parfocalized by using a fixed nominal image distance between the objective mounting shoulder and the image which is formed by the objective so as to determine whether the shoulder-to-object distance falls within the established parfocalizing limits. When a plurality of objectives of different focal lengths, such as 10×, 43× and 97× which fall within said limits, are used in a multiple objective revolving nosepiece of a microscope, the various objectives are focused successively and if the change in shoulder-to-object distance should change more than the established maximum of about .025 mm. as indicated on the fine adjustment scale, the objective involved is rejected.

It has been found that a sizable number of the objectives which pass the above-described inspection procedure, individually, do not have object distances within the established variation limit of .025 mm. when used on a nosepiece in combination with objectives of considerably different focal lengths.

In view of the aforementioned facts, it is an object of this invention to provide an improved method or procedure by which microscope optical components of a wide variety of focal lengths may be parfocalized in a single microscope.

It is a further object to provide such a method having utmost simplicity and reliability, said method being adaptable to most microscopes without alteration of the microscope optical components and requiring no costly changes in the structure of the microscope.

Figure 1:
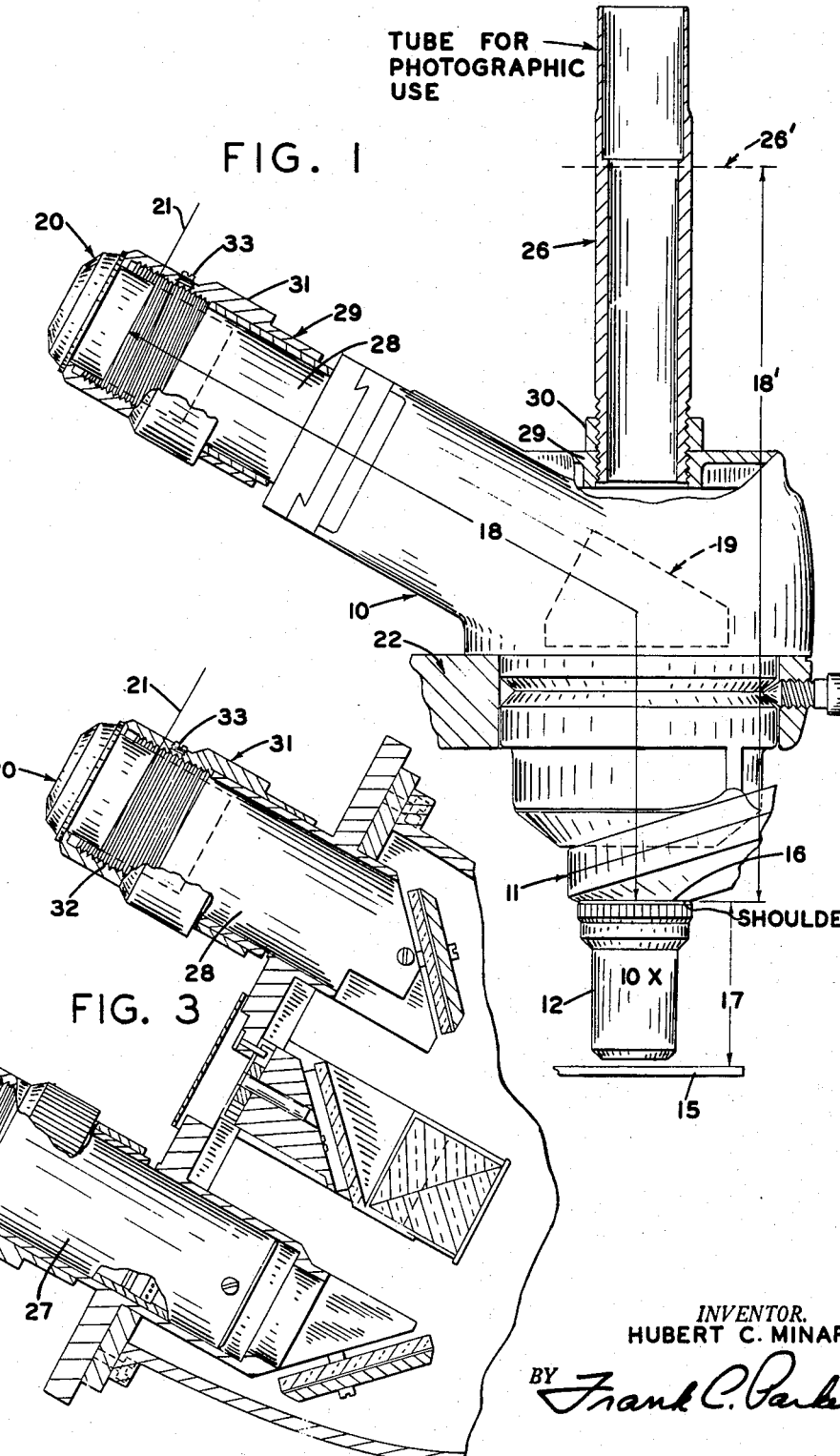
Figure 2:
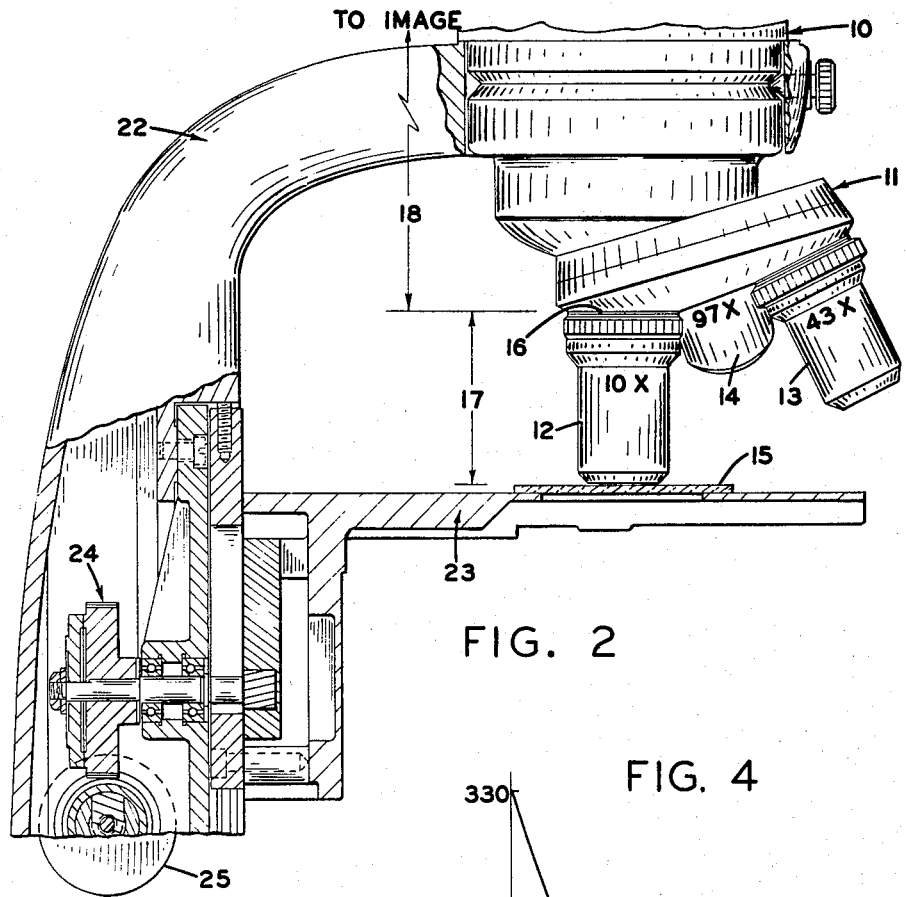
Figure 5:
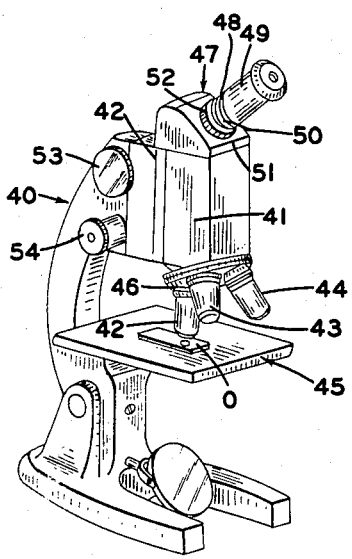
Figure 4:
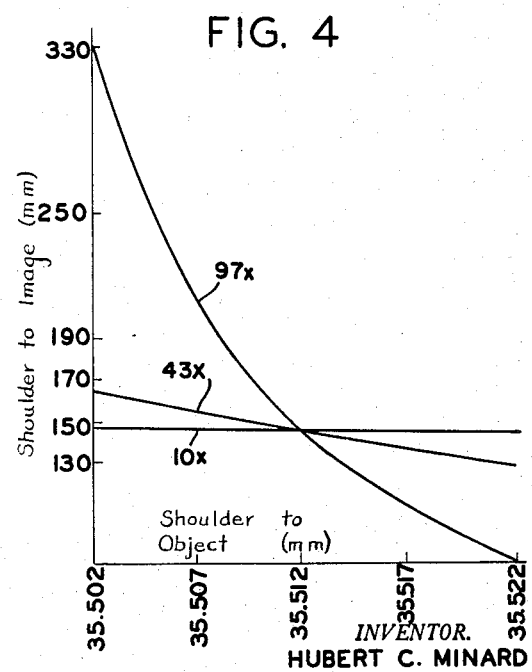

Other objects and advantages will be found from a study of the specification herebelow taken in connection with the accompanying drawings in which:

FIG. 1 is a side elevation, partly shown in section and broken away, of a microscope on which my novel method may be practiced, FIG. 2 is a somewhat fragmentary midsectional view, partly broken away, of further structure of the microscope shown in FIG. 1, FIG. 3 is a predominantly midsectional view of a binocular microscope eyepiece structure, FIG. 4 is a chart which is explanatory of this invention, and FIG. 5 is a perspective view of another kind of microscope embodying my invention.

For many years it has been common practice to alter one or more of the microscope objectives which were found upon testing to be outside of the aforesaid established parfocalization limit of .025 mm. with respect to each other, the alteration being accomplished by longitudinally adjusting the entire objective lens system in its objective mounting or sometimes by facing off the objective shoulder. By either expedient, the conjugate of the optical system on the object side was changed, thus making the objective defective for its own object-to-shoulder specification. The disadvantage of this procedure is that such a revised objective is not interchangeable with all commercially acceptable objectives, that is, it is then lacking in parfocality with other objectives of the same kind when used in other microscopes.

As a result of study and experimentation the inventor has discovered that the assumed distance from objective shoulder to image and consequent eyepiece location was frequently erroneous since it was not conjugate to the actual object distance. This condition was brought about partly by an accumulation of unilateral manufacturing tolerances in the parts which make up the "mechanical tube length." Traditionally, according to the old procedure, the objectives were actually made non-interchangeable in an effort to correct for unknown tube length errors.

By reference to the chart in FIG. 4 where the object-to-shoulder distance is plotted against the image-to-shoulder distance, it will be seen that a very large change in image-to-shoulder distance is required to effect a small change in object-to-shoulder distance for a high power objective such as 97×. Furthermore, a comparatively small change in image-to-shoulder distance will produce an equivalent change in object-to-shoulder distance in low and medium power objectives such as 10× and 43×.

According to this invention, a new method of parfocalizing microscope objectives is established as best illustrated in FIG. 1 of the drawings wherein an optical housing of a typical microscope is generally designated by numeral 10. Said housing 10 supports a rotatable nosepiece 11 on which objectives 12, 13 and 14 preferably having approximately powers respectively of 10×, 43× and 97× are mounted for interchangeable use in changing magnification of the image of an object 15. The aforementioned "objective shoulder" is numbered 16 and the "object distance" or object-to-shoulder distance is numbered 17. The corresponding image-to-shoulder distance or "image distance" is numbered 18 and is shown as a bent optical axis, said axis being redirected by an inclination prism 19 toward an eyepiece or ocular member 20 wherein the aforesaid "image" is formed at a focal plane 21.

The optical housing 10 is supported in an arm 22 above the object 15 as shown in FIG. 2 and on a vertical surface of said arm is formed a vertically adjustable supporting stage 23 whereon the object 15 is held. The aforesaid adjustment of the vertical height of the stage 23 is provided for focusing purposes and the adjusting mechanism for changing the focus is generally designated in this form of microscope by the numeral 24 which is actuated by a control knob 25. As seen in FIG. 5, a different kind of a microscope is shown, the focusing of the object being accomplished by moving the body tube 41 by the focusing controls 53 and 54.

All of the mechanism so far described is related to a binocular or monocular microscope eyepiece but single tube adaptations for photographic purposes may be provided by installing a tube as shown generally by the numeral 26 of FIG. 1. The binocular form of eyepiece is illustrated in a general way in FIG. 3 wherein the eyepieces 20 are supported on tubular extensions of support tubes 27' and 28 (FIG. 3) in a conventional and well-known manner.

The essential mechanism which is required in either monocular, binocular or photographic adaptations for supporting either an eyepiece or a photographic device is that the "optical tube length" shall be adjustable, said "optical tube length" meaning in this case the axial distance between the shoulder and the end of the support tubes 27 and 28.

The exact procedure or steps whereby the parfocalizing of a plurality of objectives of different focal lengths is accomplished will now be described in the following method steps.

*Step 1.*—with the object 15 in place on the stage 23 the medium power objective which is designated 43×, FIG. 2 is placed in working position and the object is brought into focus, as seen in the eyepiece 20, by the actuation of the conventional focusing control 25.

*Step 2.*—the low power objective designated 10× is substituted for the medium power objective in operative position but the focusing control 25 is left undisturbed.

*Step 3.*—with the 10× objective or lowest powered objective now in place, the body tube length is adjusted in length by rotating the support sleeve 31 or tube 26 until the image seen in the eyepiece 20 is perfectly focused, whereupon the high power objective 97× as well as the low power and medium power objectives are found to be parfocalized with excellent quality. After theses three method steps have been accomplished, any one of the interchangeable objectives in the nosepiece 11 may be used and the departure from perfect parfocality experienced by each interchangeable use will usually not exceed a small part of the total tolerance. In the interest of obtaining the best results from the described method, it should preferably include a further and preparatory step of selecting the various objectives from stock which are acceptable according to the same close tolerances of image-to-shoulder specification.

Referring particularly to the means for altering the axial position of the eyepiece to bring its image plane into coincidence with the image which is formed conjugate to the object 15, the eyepiece support sleeve 31 of FIGS. 1 and 3 which supports the binocular eyepiece 20 is adjustable axially on its mounting tube and when the parfocalizing adjustment is accomplished, a lock screw 33 is provided on said sleeve for locking said adjustment.

In FIG. 5 another kind of a microscope is indicated generally by the numeral 40 having a body tube 41 wherein a plurality of objectives 42, 43 and 44 is mounted over a stationary stage 45 whereon an object O is held, the "objective shoulder" for these objectives being indicated at 46. This microscope is equipped with the familiar axially movable body tube 41 whereby the objective shoulder-to-object distance may be adjusted.

On the upper end of said body tube 41 is carried a monocular eyepiece assembly which is generally indicated by numeral 47, said assembly having an eyepiece support tube 48 on which an eyepiece 49 is held. Means for adjusting the position of the eyepiece focal plane to coincide with the image formed conjugate to the object O is provided similarly to the tube 26 in FIG. 1 by threading the tube at 50 in the casing 51 and providing a threaded lock ring 52 thereon.

In this kind of a microscope, the focusing of the object, i.e., the change of the object-to-shoulder distance, is accomplished by the usual coarse adjustment and fine adjustment controls 53 and 54, respectively, and the conjugate shoulder-to-eyepiece image plane distance is thereby varied. By loosening the lock ring 52, rotating to tube 49 and again tightening the lock ring, the length of the support tube 48 may be varied.

As best shown in FIG. 1, another variation of the above-described general parfocalization method concerns the use of photographic appliances in a microscope. The attendant procedure related thereto is arranged to make use of a specified image-to-shoulder distance which is dictated by the nature of said photographic equipment.

Accordingly, the tube 26 is threaded into its supporting housing so that other photographic adaptor tubes may be used interchangeably as needed.

The method comprises the following method steps:

*Method step I.*—the photographic image plane 26' or film plane is carefully adjusted to a predetermined image-to-shoulder distance.

*Method step II.*—the object is focused at said film plane by conventional focusing controls 25.

*Method step III.*—the observer's view is shifted to the eyepiece 20.

*Method step IV.*—the longitudinal position of the eyepiece support tube 31 is adjusted to bring the image of the object into focus at an image-to-shoulder distance equal to the aforesaid predetermined distance 18'.

Thereafter, the photographic device and the eyepiece are parfocal with each other for each of a plurality of objectives in the lens turret 11 but the objectives may not be parfocal with each other.

It will be seen that the above-described parfocalizing method for a plurality of microscope optical devices is simple in its procedure and easy to understand and furthermore it has the added advantage that only a minimum of special modifications of well-constructed microscopes is necessary. Insofar as microscope objectives are concerned, the prime requisites of the above-described parfocalizing method are the capability of changing objectives, ability to focus the objective relative to the object 15, and the provision of some type of mechanism for altering the shoulder-to-eyepiece image plane distance or "tube lengths." All of these elements are usually found in microscopes which are designed for services of a nature which would require a good parfocalization of the plural objectives.

Although only certain applications of this invention have been shown and described in detail, the use thereof has wide-spread adaptability in a wide variety of microscope apparatus and a definition of the scope of this invention may be had by reference to the claims appended hereto.

I claim:

1. A method for parfocalizing a set of microscope objectives of various focal lengths which are held in a multiple objective nosepiece of a variable power microscope, said microscope having means for varying the mechanical tube length thereof, said method comprising the steps of selecting each objective of said set from those having an objective shoulder-to-object distance which is conjugate approximately to a single shoulder-to-image distance, focusing the medium power microscope objective of said set upon an object by the use of the conventional focusing controls, substituting the lowest power objective of said set for said medium power objective, and adjusting the mechanical tube length to cause the eyepiece image plane to coincide with the image which is formed by said low power objective at the changed image-to-shoulder distance which is conjugate to the adjusted shoulder-to-object distance whereupon the highest power objective of said set as well as low and medium power objectives are parfocalized with each other within close limits for interchangeable use in said microscope.

2. A method for parfocalizing a set of microscope objectives having a wide range of magnifications for use interchangeably in a microscope nosepiece, said method comprising the steps of selecting a plurality of objectives having a range of magnifications, each of said objectives having an objective shoulder-to-object distance which is conjugate to a single shoulder-to-image distance within an allowable error of ±.025 millimeters, inserting the objective of medium magnification in said microscope nosepiece and focusing the objective on a test object which rests on the microscope stage, substituting a second objective having the lowest magnification of the set for the first objective, and adjusting the mechanical tube length sufficiently to cause the eyepiece focal plane to coincide with the image formed by the second objective at a shoulder-to-image distance which is conjugate to its actual shoulder-to-object distance, whereupon all of said objectives in said set are parfocalized with each other when used in the same microscope nosepiece.

References Cited by the Examiner

UNITED STATES PATENTS

| | | | |
|---|---|---|---|
| 1,470,770 | 10/23 | Siedentopf | 88—39 |
| 1,557,503 | 10/25 | Sabel | 88—39 |
| 1,837,993 | 12/31 | Patterson | 88—39 |
| 2,518,240 | 8/50 | Lowber et al. | |
| 2,518,252 | 8/50 | Reardon et al. | |
| 2,813,458 | 11/57 | Tripp et al. | 88—39 |

DAVID H. RUBIN, *Primary Examiner.*